Figure 1:
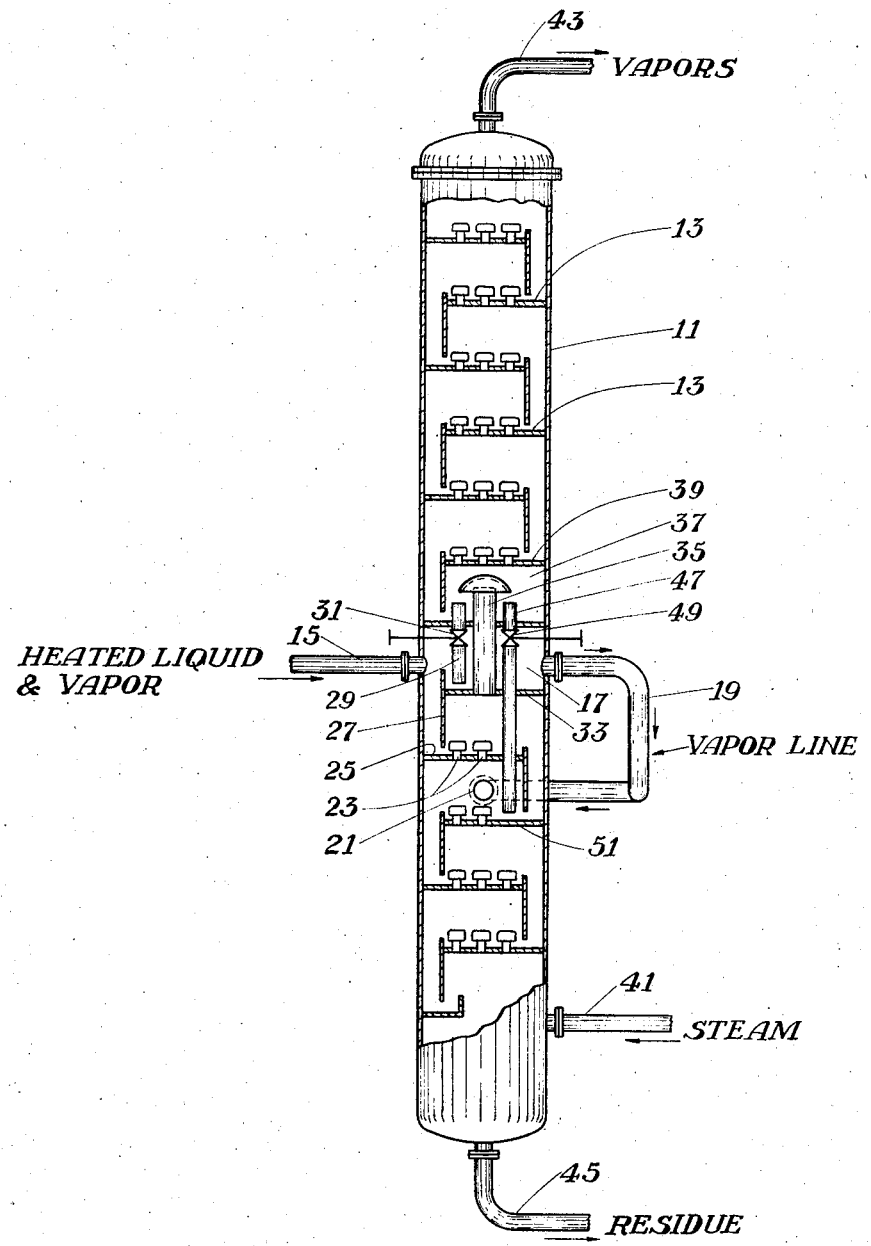

Patented Dec. 28, 1943

2,338,010

UNITED STATES PATENT OFFICE 2,338,010

METHOD AND APPARATUS FOR FRACTIONATING VAPOR-LIQUID MIXTURES

Charles M. Ridgway, Highland Park, Ill., assignor to The Pure Oil Company, Chicago, Ill., a corporation of Ohio Application September 29, 1941, Serial No. 412,817

18 Claims. (Cl. 261—114)

This invention relates to improved apparatus and method for fractionating vapor-liquid mixtures and is more particularly concerned with an apparatus and method for effecting efficient contact between vapor and liquid in bubble type fractionating columns.

The function of columns both in fractional distillation and in absorption is to effect an intimate contact between ascending vapors and descending liquid. The manner in which this is done by a fractionating column or tower is subsequently described with particular reference to the fractional separation or distilling of liquids or vapors particularly hydrocarbon liquid vapor mixtures in a bubble cap type column, but the principles of the invention are applicable in scrubbers and other devices involving countercurrent contact of liquids with gases or vapors.

In the fractionation of a liquid or vapor into its components, e. g., the separation of crude petroleum into naphtha, gasoline, kerosene, etc., or the separation of a vaporous cracking mixture into high boiling and low boiling fractions, the object is to contact a liquid with a vapor and obtain heat interchange between the two whereby the more volatile components of the liquid volatilize and pass into the vapor and the less volatile components of the vapor condense and pass into the liquid. That is, an interchange is effected between the liquid and vapor which leaves the liquid richer in components of low volatility and the vapor richer in components of high volatility than before the contact occurred.

A fractionating column serves to effect this interchange of components between a vapor and a liquid; vapor is passed upwardly through the column and liquid is passed downwardly in countercurrent relation thereto. As a result, a vapor rich in matter of high volatility can be taken out of the top of the column and a liquid rich in matter of low volatility can be taken from the bottom thereof. In other words, a "fractionation" is effected.

It is an object of this invention to provide an improved fractionating column.

It is a further object of this invention to provide an improved bubble type fractionating tower wherein means is provided for quickly and effectively separating vapor liquid mixtures charged to the tower into vapor and liquid fractions and for efficiently mixing the separated vapor fraction with vapors present in the tower.

Another object of the invention is to provide an improved method of fractionating vapor liquid mixtures.

A still further object of the invention is to provide a method of fractionating vapor liquid mixtures in which the mixtures are separated into vapor and liquid fractions and the separated vapor fraction efficiently admixed with additional vapors prior to effecting further contact with liquid fractions.

Further objects and advantages will be apparent as the description of the invention proceeds, particularly when read in conjunction with the drawing which forms a part of this specification.

In the drawing the single figure is a vertical view partly in section of a bubble type fractionating tower embodying the invention.

A fractionating tower designated generally at 11 is provided with a vertical series of bubble plates or trays 13. Vapor liquid mixture is charged to the tower through charging line 15 and enters the vapor liquid separating chamber 17, wherein the mixture is separated into liquid and vapor fractions. The vapor fraction is withdrawn from the chamber 17 through the vapor line 19 to a lower point in the tower such as 21 where the vapors are admixed with vapors rising from a lower portion of the tower, the resultant vapor mixture passing upwardly through the vapor passages 23 of bubble tray 25. The liquid on bubble tray 25 is thus intimately contacted with the rising vapors. The separated liquid fraction of the charging mixture separated in chamber 17 overflows from the chamber through the down spout 27, the upper portion of the down spout forming a weir at the bottom of the separating chamber for maintaining a liquid level therein. Liquid reflux in the fractionating tower flows progressively from one bubble plate to the next lower bubble plate as the liquid progresses downwardly through the tower. Liquid reflux from the upper portion of the tower flows into the separating chamber 17 through the downspout 29 equipped with control valve 31. The down spout 29 extends below the level of the upper weir portion of down spout 27. Thus, the liquid on plate 33 is a mixture of liquid reflux from the upper part of the tower and liquid fraction separated from the vapor liquid mixture charged. It is this liquid mixture which is intimately contacted on bubble tray 25 with vapor mixture consisting of vapors from a lower portion of the tower and the separated vapors obtained from the mixture charged. The vapors thus contacted rise through the chimney 35 into chamber 37 located just below bubble tray 39. The vapors then proceed upwardly through the tower contacting liquid reflux on the various bubble trays located in the upper portion of the tower in a conventional manner. Steam may be supplied to a lower portion of the tower through steam supply line 41, the steam progressing upwardly through the bubble trays in the lower portion of the tower and contacting vapors separated from the charging mixture at 21, the mixture of these vapors being more completely effected on bubble tray 25. Fractionated vapors are withdrawn from the top of the tower through line 43 and residual liquid removed from the bottom of the tower through line 45.

In an alternative construction, the liquid reflux from the upper portion of the tower which accumulates at the bottom of chamber 37 may be withdrawn through downspout 47 equipped with valve 49 to a point below the level at which separated fresh vapors are mixed with vapors from a lower portion of the fractionating tower, such as below the liquid level of bubble tray 51. When employing this modification, the valve 31 in downspout 29 is closed.

In fractionating an oil vapor mixture, the apparatus illustrated by Fig. 1, functions as follows: Oil and vapor mixture is charged to the tower through line 15 and the mixture separated into vapor and liquid fractions. The vapor fraction is withdrawn through vapor line 19 and admixed with additional oil vapor and steam at 21 in a lower portion of the tower. The steam is continuously supplied to the tower through line 41. The vapor mixture thus formed is contacted with liquid mixture consisting of reflux liquid flowing from an upper portion of the tower through downspout 29, the valve 49 in down spout 47 being closed, admixed with the liquid fraction separated from the charging mixture. The liquid mixture flows onto bubble plate 25 through down spout 27. The vapor mixture obtained at 21, after contacting the liquid on bubble tray 25 passes upwardly through chimney 35 into chamber 37 and contacts further liquid reflux on bubble plate 39 and on succeeding bubble plates located at higher levels in the tower.

While a specific illustration of the invention has been particularly described, it will be apparent to those skilled in the art that numerous changes and modifications may be employed without departing from the principle of the invention and it will be understood, therefore, that the invention is not to be limited except by the scope of the appended claims.

What is claimed is:

1. In a fractionating tower having a vertical series of horizontal bubble trays dividing the tower into a series of interconnecting chambers, the combination of an inlet chamber adapted to effect separation of liquid and vapor, means for admitting fluid thereto and a vapor outlet therefrom, means for conducting vapor from said vapor outlet to a lower chamber disposed below a bubble tray, liquid conducting means for conducting liquid from the lower portion of the inlet chamber to said bubble tray, means for conducting vapors released from said bubble tray to an upper chamber disposed above the inlet chamber and below a second bubble tray and means for conducting liquid from a lower portion of said upper chamber to a lower portion of the tower.

2. Apparatus in accordance with claim 1 in which the means for conducting liquid from a lower portion of the upper chamber to a lower portion of the tower conducts the liquid to a lower portion of the inlet chamber.

3. Apparatus in accordance with claim 1 in which the means for conducting liquid from a lower portion of the upper chamber to a lower portion of the tower conducts the liquid to a portion of the tower below the first-mentioned bubble tray.

4. Apparatus in accordance with claim 1 including means for conducting vapor from a lower portion of the tower to said lower chamber and a vapor inlet in the lower portion of the tower.

5. Method of fractionating a mixture of liquid and vapor comprising charging said mixture to a fractionating tower, separating the mixture into liquid and vapor fractions and re-contacting the entire separated vapor fraction with the entire separated liquid fraction, thereafter subjecting the resulting liquid and vapor fractions to further fractionation to remove lighter constituents from said liquid fraction and heavier constituents from said vapor fraction and separately removing said liquid and vapor fractions, after said further fractionation, as end products from the fractionation operation.

6. Method in accordance with claim 5 in which the separated vapor is admixed with vapor from the further fractionation of the liquid fraction prior to contact with the separated liquid fraction.

7. Method in accordance with claim 5 in which the separated vapor fraction is admixed with vapor from the further fractionation of said liquid fraction and the resultant vapor mixture contacted with the separated liquid fraction in admixture with reflux liquid from further fractionation of the separated vapor fraction.

8. Method of fractionating a mixture of liquid and vapor comprising charging said mixture to a bubble type fractionating tower, separating the mixture into liquid and vapor fractions in a separating zone, contacting the separated vapor fraction with the separated liquid fraction in a zone separate from the separating zone, thereafter subjecting said liquid fraction to fractional distillation without further contact with said charging mixture to remove lighter ends from said fraction and separately removing a vapor fraction and said liquid fraction after fractional distillation as end products of the fractionating operation.

9. Method in accordance with claim 8 in which the separated vapor fraction is admixed with vapor from the fractional distillation of said liquid fraction, prior to contact with the separated liquid.

10. Method in accordance with claim 8 in which the separated vapor fraction is admixed with steam and in which the resultant mixture is contacted with separated liquid in admixture with liquid reflux resulting from fractionation of said vapor fraction.

11. Method of fractionating a mixture of liquid and vapor comprising charging a liquid-vapor mixture to a fractionating zone, separating the mixture into liquid and vapor fractions, thereafter contacting the entire separated liquid fraction with separated vapors, then subjecting the liquid and vapor fractions to further fractionation to remove lighter constituents from said liquid fraction and heavier constituents from said vapor fraction and separately removing said liquid and vapor fractions, after said further fractionation, as end products from the fractionation operation.

12. Method in accordance with claim 11 in which the liquid and vapor fractions are subjected to further fractionation without contacting them with the liquid-vapor charging mixture.

13. Method in accordance with claim 11 in which vapors from the separated liquid fraction are admixed with said separated vapors prior to contacting the latter with the separated liquid fraction.

14. A fractionating tower comprising a separating chamber, a fluid inlet connected thereto, a fractionating section below said chamber and a fractionating section above said chamber, a vapor conduit connecting said chamber to said lower fractionating zone, a vapor conduit independently of said separating chamber connecting the upper and lower fractionating zone, and means for discharging liquid from the separating chamber to the lower fractionating section.

15. A fractionating tower in accordance with claim 14 including a liquid conduit for directly discharging liquid from said upper to said lower fractionating section.

16. A fractionating tower in accordance with claim 14 including a liquid conduit for passing liquid from the upper fractionating section to the separating chamber.

17. A fractionating tower in accordance with claim 14 including a liquid conduit directly connecting the upper fractionating section to said separating chamber and a liquid conduit connecting said upper fractionating section to said lower fractionating section and valve means in each conduit.

18. Method in accordance with claim 8 in which the vapors from the fractional distillation of said liquid fraction are admixed with vapors separated from said liquid-vapor mixture.

CHARLES M. RIDGWAY.